T. STEELE.
METHOD OF MANUFACTURING ARTIFICIAL TOOTH FRONTS.
APPLICATION FILED MAY 15, 1911.

1,082,365.

Patented Dec. 23, 1913.

Witnesses
W. S. Bock
A. L. Phelps

Inventor
Thomas Steele

By
C. C. Shepherd
Attorney

UNITED STATES PATENT OFFICE.

THOMAS STEELE, OF COLUMBUS, OHIO, ASSIGNOR TO THE COLUMBUS DENTAL MANUFACTURING COMPANY, OF COLUMBUS, OHIO, A CORPORATION OF OHIO.

METHOD OF MANUFACTURING ARTIFICIAL TOOTH-FRONTS.

1,082,365.	Specification of Letters Patent.	Patented Dec. 23, 1913.

Application filed May 15, 1911. Serial No. 627,237.

*To all whom it may concern:*

Be it known that I, THOMAS STEELE, a citizen of the United States, residing at Columbus, in the county of Franklin and State of Ohio, have invented certain new and useful Improvements in Methods of Manufacturing Artificial Tooth-Fronts, of which the following is a specification.

My invention pertains to an improved method of manufacturing artificial tooth fronts and is particularly directed toward providing an improved series of correlated steps for manufacturing tooth fronts of a standard form and size and in such a manner that absolute accuracy of measurement and construction is attained with a minimum difficulty. It is intended, by this method, to form the various surfaces of the tooth front and in the act of forming these various surfaces to effect a coactive measuring action between the parts in such a manner that a perfect tooth front is formed. By way of illustration of some of the different series of steps which may be taken to attain the desired result, and at the same time be within the spirit of the method utilized by me, attention is called to the accompanying drawings.

Figure 1:
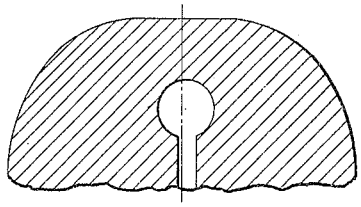
Figure 5:
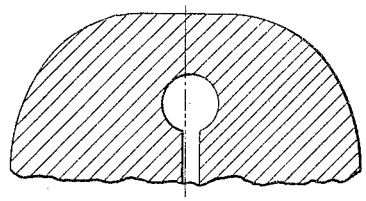
Figure 2:
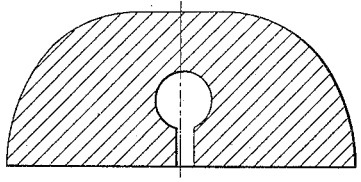
Figure 6:
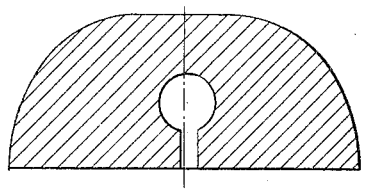
Figure 3:
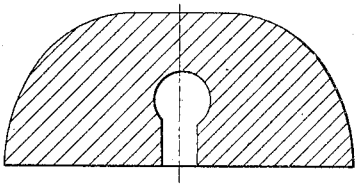
Figure 7:
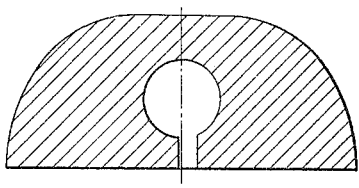
Figure 4:
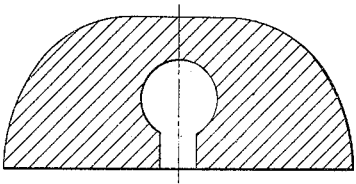
Figure 8:
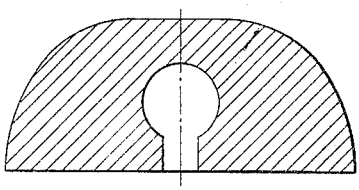
Figure 9:
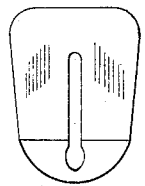
Figure 10:

Referring to the drawings specifically and with particular reference to my preferred method: Figure 1 is a transverse section of a tooth front in its condition of removal from the mold and in rough form and showing the hole and slot baked therein, but considerably off center, Fig. 2 is a transverse section of the baked tooth with its rear surface smoothed to a practically perfect plane. Fig. 3 is a transverse section of the tooth front after the slot has been accurately centered, which is preferably effected by means of a perfect plane surface in conjunction with a gripping means for the tooth front and a relatively traveling cutter, which cutter must necessarily travel in a line of predetermined length and relation to the plane surface and to the means for holding the tooth, Fig. 4 is a transverse section of the tooth after the hole has been centered, which is desirably effected by the provision of a centering element to be straddled by the walls of the slot in the tooth front. It will of course be understood that this centering element bears a determinate relation to a boring tool or tools for correcting the inaccuracy of the bore. This sets forth the relation of the successive steps of my preferred method of coactively centering the surface of the tooth front. Another method is illustrated by other figures of the drawing, as follows: Fig. 5 is a cross section of an artificial tooth front as removed from a mold in rough form and with both the hole and slot off center, Fig. 6 is a cross section showing the tooth front with its rear surface ground to a practically perfect plane, Fig. 7 is a cross sectional view of the tooth front showing its rear surface ground to a perfect plane as in the preceding figure and showing the bore in the tooth accurately centered, in the effecting of which the plane surface plays an important part as does a holding mechanism for maintaining the tooth front in a definite position on its rear surface and in proper relation to a boring device, Fig. 8 is a cross sectional view of the tooth front in its completed condition and with its rear surface ground to a perfect plane its bore accurately centered as before stated and its slot properly centered which is effected through the medium of a centering element upon which the tooth front is mounted through the utilization of the properly centered bore. These last four figures are designed to show a second way of effecting the desired result in accordance with my method. Fig. 9 is a rear elevation of the tooth front, and, Fig. 10 is an edge view of one of the tooth fronts.

The science of manufacturing artificial teeth and tooth fronts, is one that is subject to and effected by a number of elements and circumstances solely its own. Chief among these circumstances, is the liability of shrinkage. It is a known fact in the art of manufacturing tooth fronts, that the degree of shrinkage in a tooth during baking is in the neighborhood of 26%. Necessarily, this shrinkage is accompanied by a certain amount of distortion. The degree of shrinkage and distortion is ordinarily regulated and controlled by the length of baking and of course is necessarily affected by the uneven packing of the mold. Furthermore, which is of equal importance, it is customary in making these tooth fronts to utilize two or more different grades of material, which in fusing show relatively different degrees of shrinkage. This will be readily understood when it is pointed out that the masticating surface of the tooth fronts is necessarily of a rigidity of a porcelain nature, whereas it is advisable to provide the walls of the slot and hole of a less brittle quality of material. The making of the teeth in different colors, also effects this in a measure and when a plurality of different materials is used, it will be well understood that the shrinkage and distortion will be necessarily uncertain and ungovernable.

The present invention and method of repairing tooth fronts is thought to obviate any draw-back attendant upon the features noted above.

What I claim, is—

1. The method of treating an artificial tooth front, after it has been baked with a longitudinal bore and a communicating transverse slot therein, commensurate with the length of said bore, to form the various surfaces of the tooth front and in the act of forming these various surfaces to effect a coactive measuring action between the parts in such manner that a perfect tooth front is formed, which consists in smoothing the rear surface of the tooth front to a perfect plane, then accurately centering the transverse slot with the said plane as a guide, and finally accurately centering the bore with the transverse slot as a guide.

2. The process of making artificial tooth fronts which consists in molding the biscuit with an elongated slot in its rear face and a communicating bore disposed longitudinally of the tooth front, baking the biscuit, smoothing the rear face of the tooth front to a perfect plane, centering the bore accurately both longitudinally and transversely with reference to the plane of the back of the tooth front and finally accurately centering the said slot with reference to the bore and the plane of the back of the tooth front, whereby exact interchangeable duplicates of tooth fronts are made.

3. The method of treating artificial tooth fronts, after they have been baked with a transverse slot and a longitudinal bore communicating with said slot and of greater length than said slot, to form the various bearing surfaces of the tooth fronts and in the act of forming said surfaces to effect a co-active measuring action between the said surfaces in such manner that an accurately interchangeable tooth front is formed, which consists in first grinding the rear surface of the tooth front to a perfect plane, then accurately centering the transverse slot with said plane as a guide, then accurately centering the bore with the transverse slot with respect to the slot using the slot as a guide, grinding the bore throughout its length parallel to the plane of back of the tooth front and of greater length than the said slot.

In testimony whereof I affix my signature in presence of two witnesses.

THOMAS STEELE.

Witnesses:
W. L. TRUESDELL,
EDWIN P. CORBETT.